(12) United States Patent
Nickolson et al.

(10) Patent No.: US 11,455,851 B2
(45) Date of Patent: Sep. 27, 2022

(54) HAZARDOUS ENERGY CONTROL SYSTEM

(71) Applicant: autoLOTO, Inc., Clive, IA (US)

(72) Inventors: Kenneth David Nickolson, Derry, NH (US); Daniel Lawrance Furbush, Herndon, VA (US)

(73) Assignee: AUTOLOTO, INC., Clive, IA (US)

( * ) Notice: Subject to any disclaimer, the term of this patent is extended or adjusted under 35 U.S.C. 154(b) by 110 days.

(21) Appl. No.: 16/868,621

(22) Filed: May 7, 2020

(65) Prior Publication Data

US 2021/0065485 A1 Mar. 4, 2021

Related U.S. Application Data

(60) Provisional application No. 62/895,169, filed on Sep. 3, 2019.

(51) Int. Cl.
| | | |
|---|---|---|
| *G07C 9/00* | (2020.01) | |
| *G05B 19/418* | (2006.01) | |
| *F16P 3/14* | (2006.01) | |
| *G07C 9/22* | (2020.01) | |

(52) U.S. Cl.
CPC .......... *G07C 9/00309* (2013.01); *F16P 3/147* (2013.01); *G05B 19/4183* (2013.01); *G07C 9/22* (2020.01)

(58) Field of Classification Search
CPC .. G07C 9/22; G07C 9/00309; G07C 9/00817; G07C 1/32; G07C 2009/00769; G07C 9/00896; F16P 3/147; F16P 3/00; G05B 19/4183; G05B 1/01; G06F 21/44; G06F 21/604; G06F 21/6218; E05B 65/48; G06K 7/10297

USPC ......... 235/386, 376; 340/5.1, 5.2; 200/43.01
See application file for complete search history.

(56) References Cited

U.S. PATENT DOCUMENTS

| | | | |
|---|---|---|---|
| 2003/0187865 A1* | 10/2003 | Frisina ............. | G05B 19/41865 |
| 2005/0146319 A1* | 7/2005 | Weems, II ............. | G01R 35/00 |
| | | | 702/61 |
| 2005/0237048 A1* | 10/2005 | Weems, II ............. | G01R 35/00 |
| | | | 324/115 |
| 2007/0225832 A1* | 9/2007 | Hasunuma ............... | G21D 3/00 |
| | | | 700/19 |
| 2013/0214903 A1* | 8/2013 | Kalous ............... | G07C 9/00309 |
| | | | 340/5.61 |
| 2014/0176303 A1 | 6/2014 | Stratton et al. | |
| 2014/0283008 A1* | 9/2014 | Daino ................. | G06F 21/6218 |
| | | | 726/17 |
| 2015/0015234 A1* | 1/2015 | Ayanegui ............. | G01R 19/155 |
| | | | 324/76.11 |
| 2016/0282828 A1 | 9/2016 | Jauquet et al. | |

(Continued)

OTHER PUBLICATIONS

International Searching Authority, "Notification of Transmittal of The International Search Report and The Written Opinion of the International Searching Authority", for PCT/US2020/032051, dated Aug. 6, 2020, 7 pages.

*Primary Examiner* — Edwin C Holloway, III
(74) *Attorney, Agent, or Firm* — Jonathan B. Soike; BrownWinick Law Firm

(57) ABSTRACT

A hazardous energy control system has a web-based application adapted to be associated with a personal electronic device. The application has a worksite manager that is created from project documents that are uploaded to the application and selectively displays locations for equipment and hazardous energy barriers.

11 Claims, 4 Drawing Sheets

(56) References Cited

U.S. PATENT DOCUMENTS

2016/0294179 A1* 10/2016 Kennedy ................ H02H 7/261
2022/0060541 A1* 2/2022 Shokooh ................ G06Q 50/06

* cited by examiner

HAZARDOUS ENERGY CONTROL SYSTEM

CROSS REFERENCE TO RELATED APPLICATION

This application claims the benefit of U.S. Provisional Application No. 62/895,169 filed on Sep. 3, 2019, the contents of the provisional application are hereby incorporated by reference in its entirety.

BACKGROUND OF THE INVENTION

The present invention is directed to a system for hazardous energy and is a live web-based application that is compatible with mobile and computer platforms that utilize permission based and auditable personal profiles to identify and instruct users how to safely isolate specific equipment from hazardous energy sources.

Modern machinery and equipment expose workers to many forms of hazardous energy, such as from electrical, mechanical, pneumatic, hydraulic, and others. Disconnecting or making the equipment safe to work on involves the removal of all energy sources and is known as isolation. Presently, there exist safety procedures used in industry and research settings to ensure that dangerous energy sources have been properly shut down and are incapable of being started up again prior to the completion of construction, maintenance, or servicing work. The procedure generally requires that all hazardous energy sources are identified, isolated, and rendered inoperative to prevent the release of potentially hazardous energy prior to the start of any construction, repair or maintenance procedure by locking and tagging all energy sources.

While the process is useful, the process involves filling out paper logbooks, manually updating electrical one-line drawings to reflect current status of energy sources, is time consuming, and subject to human error. As electricity on a job site is the most dangerous and has the highest mortality rate of all construction related injuries, a modernized system that addresses current problems is needed in the industry.

An objective of the present invention is to provide a hazardous energy control system that is safe to use and reduces injuries.

Another objective of the present invention is to provide a hazardous energy control system that is more accurate and less time consuming.

These and other objectives will be apparent to those having ordinary skill in the art based upon the following written description, drawings, and claims.

SUMMARY OF THE INVENTION

A hazardous energy control system is a web-based application associated with a client device, having software and a memory source, associated with the user. The application is adapted to be connected to a personal electronic device to assist a user in managing worksites and conducting a lockout/tagout (LOTO) process.

The application permits a user to view information related to different worksites, track equipment, and create, review, and edit a personal profile linked to the user. Also, the application has a scan function and permits the user to review and/or conduct multiple LOTO procedures.

To conduct a LOTO process, project drawings and/or documents are input or uploaded by the user to facilitate a worksite manager that includes the location of equipment and hazardous energy barriers. The application first requires that the user confirm that the user has received the required training. The user then selects a piece of equipment to be associated with the application and/or to apply the LOTO process.

Upon acknowledgement by the user, the application automatically displays the hazardous energy barrier linked to the piece of equipment. The application then requires the user to verify that they are in the correct position to hang a lock and that the lock has been authorized. Finally, the application requires the user to verify they are in the correct position to conduct a Live Dead Live test on the selected piece of equipment.

DETAILED DESCRIPTION OF THE PREFERRED EMBODIMENTS

Figure 1:
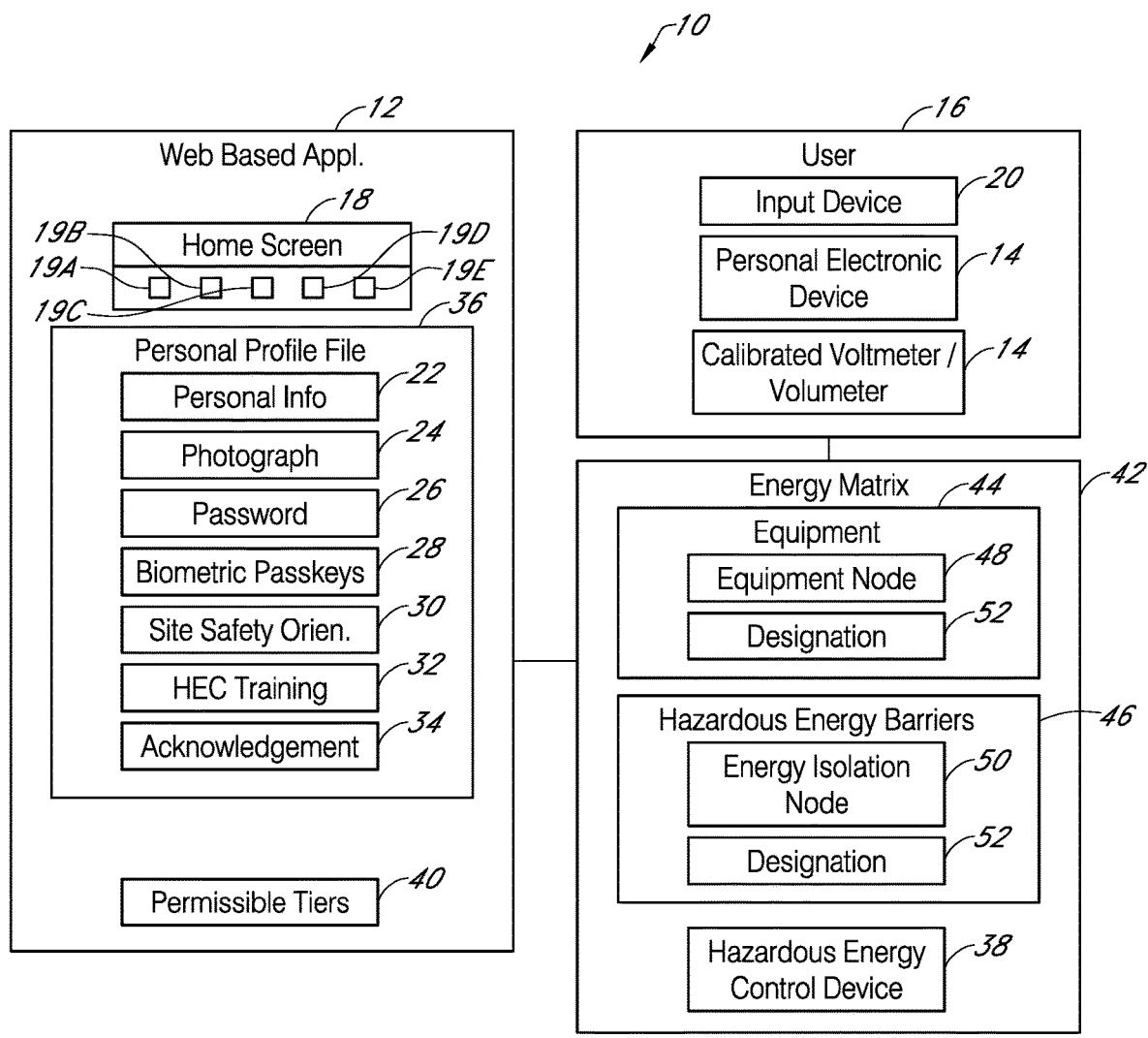
FIG. 1 is a schematic view of a hazardous energy control system.
Figure 2:
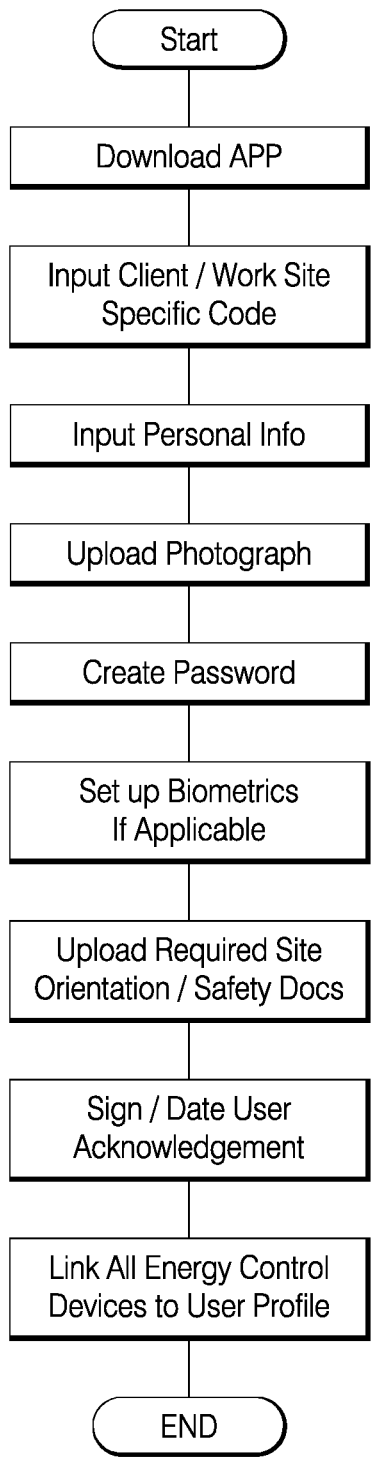
FIG. 2 is a flow diagram of a hazardous energy control system.
Figure 3:
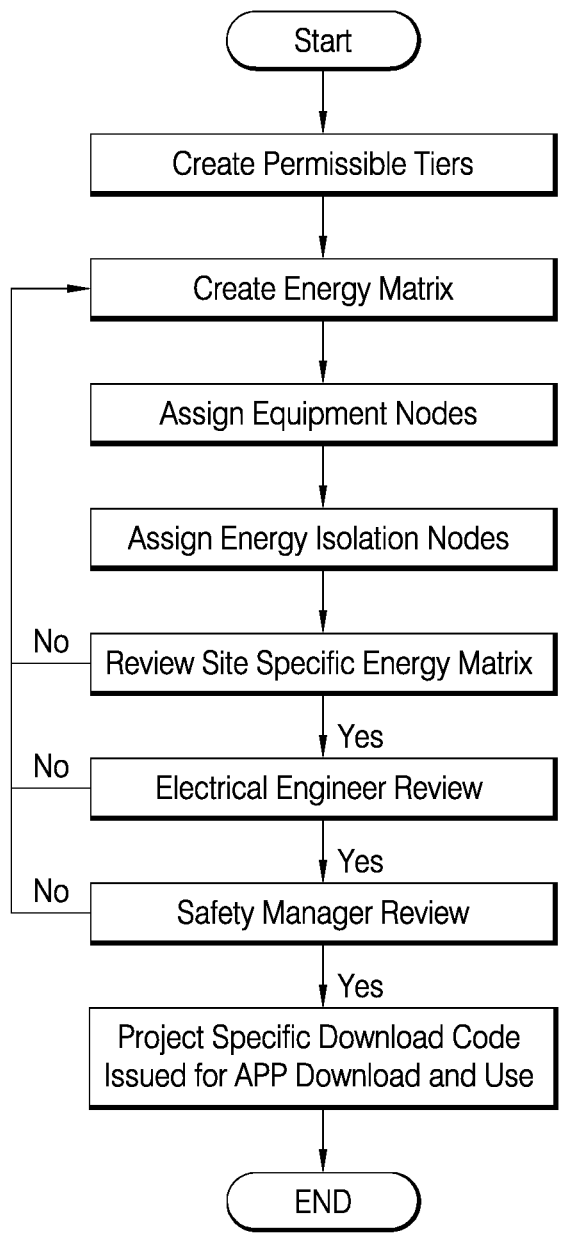
FIG. 3 is a flow diagram of a hazardous energy control system.
Figure 4:
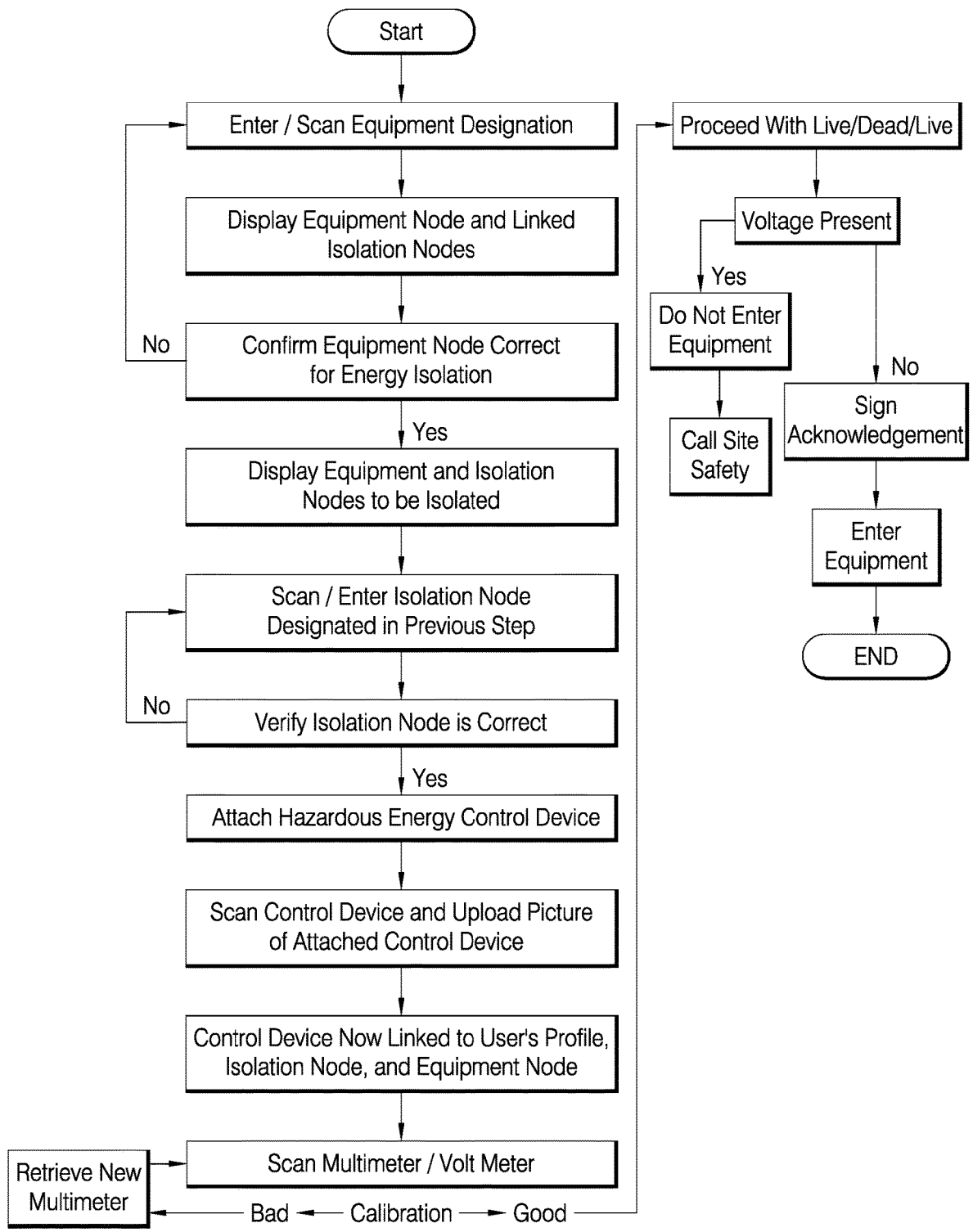
FIG. 4 is a flow diagram of a hazardous energy control system.

Referring to the Figures, a hazardous energy control system 10 has a web-based application 12 adapted to be downloaded to a personal electronic device 14 such as a mobile phone, computer, mobile tablet, or the like. To download the application, a user 16 gives the application permission for the application 12 to use the devices 14 capabilities. The application has a home page 18 with a plurality of buttons that include a scan function 19A, a lockout review tab 19B, a personalized worksite activity tab 19C, and equipment tracking tab 19D, and a unique user profile tab 19E. The user 16 is then prompted to input personal information 20 via the user profile tab 19D on the home page 18. The personal information 20 is of any type and includes the user's 16 name, work phone number, personal phone number, work e-mail, current employer, direct report/supervisor/manager, company safety representative and the like.

Next, the user 16 is prompted by the application 12 to take or upload a head shot photograph 24 of the user 16 preferably without head gear or glasses, unless glasses are always worn. The user 16 is then prompted by the application 12 to create a password 26 and apply any additional biometric passkeys 28 supported by the device 14.

The user 16 is also prompted by the application 12 to upload the user's site safety orientation certification 30 and hazardous energy control training 32. The application 12 will then prompt the user 16 to electronically sign and date an acknowledgement 34 that they have completed all site safety orientation, including lock out tag out and hazardous energy control training.

All this information, the personal information 22, the photograph 24, the password 26 and biometric passkeys 28, safety orientation certification 30, hazardous energy control training 32, and training acknowledgement 34 are stored in a personal profile file 36 created by the application 12. The personal profile 36 is completed when the user 16, prompted by the application 12, links specific hazardous energy control devices 38 to the user's personal profile file 36. The hazardous energy control devices 38 include, but are not limited to, personal life and safety locks, lock boxes, equipment control locks, proprietary electronic life and safety locks specific to the application 12, calibrated electrical equipment such as multimeters and voltmeters, and additional training certification required to access permissible tiers 40.

Permissible tiers 40 are created by the application 12 to permit different access to the system 10. For example, a tradesman would be provided lowest access such as individual lockout/tagout (LOTO) permissions only. For a foreman, additional permissions for control boxes with two-party verification would be granted. Added to these permissions, a general foreman and/or general contractor supervisor would also be given control access lock permissions/energizations. These permissions might also be granted to quality assurance/quality control team, CX— Commissioning, trade partner safety managers and/or general contractor safety managers. Lock removal permissions would be added to a tier including the overall site safety manager and/or the project administrators.

An energy matrix, or worksite manager 42, created from project drawings and documents is input or uploaded to the application and includes the location of equipment 44 and hazardous energy barriers 46. Each piece of equipment 44 is assigned an equipment node or an identification number (e.g., QR/bar code) 52. Each hazardous energy barrier 46, (i.e. Energy Isolation Device (EID)) that includes, but is not limited to, a circuit breaker, valve, or the like, is assigned an energy isolation device code 50. The isolation codes 50 provide an anchor for the worksite manager 42 between the equipment 44 and energy pathways.

To initiate a LOTO procedure or view the status of a piece of equipment, the user 16, scans the equipment identification number (e.g., QR/barcode) 52 of the specific piece of equipment 44 using the scan function 19A or enters the identification number 52 placed on the piece of equipment 44. Once entered, the application 12 displays all line sources of power entering the selected equipment 44, all load sources the selected equipment is powering, and any redundant or parallel power sources that the selected equipment may share with another piece of equipment. The application 12 also displays the status of the selected equipment (i.e., live) preferably in both text and color code (an icon—Red indicating energy source live/present/on-danger—Black indicating energy source off/isolated, safe).

When the selected equipment 44 is live and unsafe, the user clicks on the EID 46 on the application screen 12 that controls power entering the selected equipment 44 to determine the type of EID 46, the current status for the EID 46, and whether any locks 38 are currently installed on the EID 46. Also displayed is a link upstream to the piece of equipment 44 the EID 46 received power from. The user 16 then specifies a desire to begin the LOTO process by selecting from two options—either an individual LOTO to lock out a single piece of equipment or a group LOTO to lock out multiple pieces of equipment.

The user 16 then scans the piece of equipment 44 that the user 16 wishes to isolate and ultimately enter using the scan function 19A or enters the equipment's identification number 52. The application 12, then presents the user 16 with a user acknowledgement page 54. In order to ensure the user's safety, they must acknowledge that they have been trained in Lockout/Tagout, Live Dead Live, NFPA 70E, and OSHA guidelines and regulations. To proceed the user 16 acknowledges he/she has the necessary training for the selected piece of equipment and agrees to the displayed terms.

The application 12 then, having reviewed the electrical one-line drawing for the worksite, automatically determines and displays a preview of the EID(s) 46 that the user 16 will need to hang his/her lock 38 on to render inoperable and be able to safely enter the user's selected piece of equipment 44. The application 12, through a display, asks the user 16 if he/she is in the correct position and at the correct EID 46 in order to hang the lock 38 on the EID 46. The user 16 then scans the isolation code 50 for the EID 46 that he/she believes to be correct using the scan function 19A. The application 12 will verify and indicate whether the user 16 has scanned the correct EID 46. If not correct, the user will be instructed to rescan a different EID 46 until the correct EID 46 is identified. The application, through an icon that turns a given color, indicates that the correct EID 46 has been located.

The application 12 then prompts the user 16 to scan the lock 38 that will be hung on the EID 46 using the scan function 19A to link the user's personal profile 36 to the lock 38 on the selected equipment 44. If the user 16 scans a lock 38 not linked to his/her personal profile 36, the application 12 will notify the user 16 to select a different lock 38. Once a correct lock 38 is selected and hung on the EID, the application 12 prompts the user to take a photograph of the lock to prove to the system that the EID 46 has been locked out satisfactorily and provide documentation of the lock 38 hung at the correct EID 46. At this point the user 16 will have the option to provide comments explaining the need for the lock (i.e. monthly scheduled maintenance, inspection, etc.).

Next, the user 16 must prove that the selected piece of equipment 44 is safe to enter. The application 12 automatically displays a preview of the worksite 42 and displays a preview of the line side(s) of the EID(s) that provide power into the selected piece of equipment 44. The application 12 then prompts the user 16 to ensure he/she is in the correct position to perform a Live Dead Live (LDL) test to prove the selected piece of equipment 44 is electrically safe to enter. The application will also display a status bar that is partially blue to indicate that the user 16 has successfully completed the first half of the LOTO process and has successfully hung his/her lock 38. The process of identifying the correct EID is repeated for the LDL test.

A user 16 may exit in the middle of the LOTO sequence, and the application 12 will return the user to a safe starting point to continue when the user 16 is ready. This is done by returning to the home screen 18 and accessing a lockout tab 19B. This takes the user to a page where he/she may review all active LOTOs. Also, by accessing the personal profile tab 19E, a user can view which locks are in use and which are still available. By clicking on any of the locks in use the user 16 is immediately taken to the selected piece of equipment 44 and the specific EID 46 that the lock 38 is hung on. Also displayed are voltmeters registered to the user profile that indicate whether they are available and within calibration dates or overdue for calibration and not usable on site. The user profile will also include a unique activity log where all actions are tracked to the minute by the application 12.

A lockout review page will permit the user to access a page for each LOTO process that denotes the type of lockout completed, the owner of the lockout, the date and time the lockout was started, the date and time the lockout was completed, and the record of the Live Dead Live testing to prove the equipment was free of electrical hazardous energy. For an incomplete LOTO process, the user 16 has the option of abandoning the LOTO process or resuming and picking up where the process was left off.

The locks tab within the lockout details page will indicate which locks are currently in use to complete an ongoing LOTO process. If the user 16 wishes to resume, a confirmation page is displayed to ensure that the user has correctly selected the LOTO process he/she wishes to continue. The application will then orient the user 16 to the correct EID to start his LDL testing. The user 16 repeats the process for identifying the correct EID. Once confirmation is obtained that the correct EID has been identified, the application prompts the user 16 to scan the voltmeter he/she will use in order to check for the presence of hazardous electrical energy. The user 16 scans the voltmeter to ensure that the voltmeter has been successfully registered on the worksite and is within the required calibration window. After taking a voltage reading of the selected equipment 44, the application 12 will analyze the voltage reading to determine if the user 16 can continue with each test. If the user 16 records a voltage reading of 0V he/she has not adequately satisfied the requirements and in fact may be testing a live source to prove to himself and the application that his voltmeter is operational. A reading above 0V constitutes a pass for the first Live portion of the Live Dead Live testing procedure. To pass the second Dead portion, a reading of 0V must be obtained. Finally, the pass the last Live portion, a reading greater than 0V must be received. Once the LDL test is completed the user 16 may leave a comment. At this point, the application 12 provides confirmation that the user 16 has successfully completed the LOTO process and proved that it is electrically safe to enter the selected equipment 44.

The user 16 can review all active LOTOs from the Lockouts review tab at the bottom of the home screen. From this page the user can select and review all active LOTOs in the worksite that he/she is involved with.

To remove a lock 38, the user 16 engages the lockout tagout tab which leads him/her to the lockout details page where he/she is given the option of removing a lock from the LOTO process. By clicking on a locks tab within the lockout detail page the application 12 will indicate all locks currently in use to complete a present LOTO process. By selecting a remove locks icon a user begins the lock removal process. The application 12 then presents the user 16 with an acknowledgement page that requires the user to read and agree to before being able to remove his/her locks from the LOTO process. The application 12 has kept track of the exact location of the lock for the duration of the LOTO process and upon acknowledgement, provided the user 16 with the exact physical EID location that the lock is currently hanging on. The user 16 then scans what is believed to be the correct EID. If incorrect, the user 16 will be instructed to keep scanning. Once correct, the user 16 is prompted by the application 12 to scan the lock prior to removal. This permits the lock to be deregistered from the piece of equipment and the specific EID that it was placed on. The lock will then be visible on the application as being available in the user's unique personal profile. If the correct lock is scanned the user 16 has successfully broken down his/her LOTO process to isolate the selected equipment and his/her lock is returned back into active status in his/her unique personal profile. This information will also be reflected on the user's activity log.

To view information related to different worksites 42, the user 16 selects the personalized activity tab 19C which provides a listing of each worksite, the company associated with the worksite, the number of pieces of equipment used with the worksite, the number of EIDs used with the worksite and the number of users associated with the work site. Also included is a contact name and phone number and a screen were users can be selected to be given access to the site as well as assigning the users role.

To manage the equipment for a worksite, the user 16 selects the equipment number associated with the worksite and is provided with a list that includes the name of the equipment, the location, the barcode, the number of lines, the number of loads, the number in parallel, whether the equipment is passive, and whether the relationship is complete. The same can be done with EIDs and locks.

From the above discussion and accompanying figures and claims it will be appreciated that the system 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A hazardous energy control system for on-site lockout/tagout of equipment, comprising:
   a personal electronic device;
   wherein the personal electronic device includes a display screen and is configured to provide a user interface for a user to select equipment to lockout/tagout;
   wherein the personal electronic device is configured to determine, from a one-line drawing for the worksite, a set of energy isolation devices that a user will need to hang a lock on to render inoperable and be able to safely enter the selected equipment;
   wherein the user interface is configured to guide the user through a lockout/tagout process requiring the user to hang a lock on the determined set of energy isolation devices and thereby render the selected equipment inoperable and safe to enter;
   a voltmeter;
   wherein in guiding the user through the response to lockout/tagout process to hang a lock on a first one of the determined set of energy isolation devices, the user interface is configured to prompt the user to scan the voltmeter;
   wherein in response to the user scanning the voltmeter, the personal electronic device is configured to determine if the voltmeter is within a required calibration window;
   wherein in response to the voltmeter is within a required calibration window, the user interface is configured to guide the user through a Live Dead test on the first one of the determined set of energy isolation devices using the voltmeter.

2. The system of claim 1 wherein the personal electronic device is configured to automatically determine and displays hazardous energy barriers that require a lock to permit the user to safely enter a select piece of equipment.

3. The system of claim 1 wherein the personal electronic device is configured to require the user to acknowledge that the user has received required training.

4. The system of claim 2 wherein the personal electronic device is configured to require the user to verify a correct position in relation to the displayed hazardous energy barriers.

5. The system of claim 2 wherein the personal electronic device is configured to verify whether a lock hung on the displayed hazardous energy barrier is linked to a personal profile of the user.

6. The system of claim 1 wherein the personal electronic device is configured to require the user to verify that the user is in the correct position to conduct a Live Dead Live test.

7. The system of claim 1 wherein the user interface includes a scan function to facilitate the selection of equipment by the user.

8. The system of claim 1 wherein the personal electronic device is configured to permit a user to review information related to each lockout tagout process.

9. The system of claim 1 wherein the personal electronic device is configured to permit a user to review information related to different worksites.

10. The system of claim 1 wherein the personal electronic device is configured to permit a user to create, review, and edit a personal profile linked to the user.

11. The system of claim 1, wherein in response to the user selecting the equipment to lockout/tagout, the personal electronic device is configured to display:
- all line sources that power the selected equipment;
- all load sources powered by the selected equipment; and
- any redundant or parallel power sources that the selected equipment may share with another piece of equipment.

* * * * *